US008259797B2

(12) United States Patent
Glenn

(10) Patent No.: US 8,259,797 B2
(45) Date of Patent: Sep. 4, 2012

(54) METHOD AND SYSTEM FOR CONVERSION OF DIGITAL VIDEO

(75) Inventor: William E. Glenn, Lighthouse Point, FL (US)

(73) Assignee: Florida Atlantic University, Boca Raton, FL (US)

( * ) Notice: Subject to any disclaimer, the term of this patent is extended or adjusted under 35 U.S.C. 154(b) by 349 days.

(21) Appl. No.: 12/584,829

(22) Filed: Sep. 11, 2009

(65) Prior Publication Data

US 2010/0098152 A1    Apr. 22, 2010

Related U.S. Application Data

(60) Provisional application No. 61/192,049, filed on Sep. 15, 2008.

(51) Int. Cl.
*H04N 7/12* (2006.01)
*H04N 7/14* (2006.01)

(52) U.S. Cl. ................ 375/240.1; 348/14.13
(58) Field of Classification Search ........... 348/207.1, 348/725, 739, 459, 556, 445, 558, 699, 700; 375/240.12, 240.16, 240.29, 240.26; 382/265, 382/238, 236, 260, 215
See application file for complete search history.

(56) References Cited

U.S. PATENT DOCUMENTS

| 4,517,597 | A | 5/1985 | Glenn | 358/141 |
|---|---|---|---|---|
| 4,628,344 | A | 12/1986 | Glenn | 358/12 |
| 4,652,909 | A | 3/1987 | Glenn | 348/41 |
| 4,667,226 | A | 5/1987 | Glenn | 358/41 |
| 4,733,299 | A | 3/1988 | Glenn | 358/140 |
| 5,349,385 | A | 9/1994 | Glenn | 348/458 |
| 5,739,867 | A | 4/1998 | Eglit | 348/581 |
| 5,953,074 | A | 9/1999 | Reddy | 348/558 |
| 6,078,361 | A | 6/2000 | Reddy | 348/558 |
| 6,549,240 | B1 * | 4/2003 | Reitmeier | 348/459 |
| 6,690,881 | B1 * | 2/2004 | Tomita et al. | 386/224 |
| 6,714,592 | B1 | 3/2004 | Liu et al. | 375/240.13 |
| 7,408,986 | B2 * | 8/2008 | Winder | 375/240.12 |
| 7,990,389 | B2 * | 8/2011 | Barone | 345/475 |
| 2005/0002646 | A1 | 1/2005 | Sato | 386/68 |
| 2005/0117775 | A1 | 6/2005 | Wendt | 382/100 |
| 2005/0265448 | A1 | 12/2005 | Nozawa | 375/240.12 |
| 2006/0045493 | A1 | 3/2006 | Ohashi et al. | 386/124 |
| 2007/0031129 | A1 | 2/2007 | Hosokawa | 386/131 |

FOREIGN PATENT DOCUMENTS

| EP | 0598480 | 5/1994 |
|---|---|---|
| EP | 0637889 | 2/1995 |
| EP | 0661885 | 7/1995 |
| EP | 1469673 | 10/2004 |
| EP | 1471733 | 10/2004 |
| EP | 1492343 | 12/2004 |
| EP | 1775960 | 4/2007 |
| JP | 05328326 | 12/1993 |
| JP | 09182074 | 7/1997 |
| JP | 00188760 | 7/2000 |
| WO | WO 00/45362 | 8/2000 |

* cited by examiner

*Primary Examiner* — Hanh Nguyen
(74) *Attorney, Agent, or Firm* — Martin Novack

(57) ABSTRACT

A method for converting an encoded digital video signal from a decoded relatively lower frame rate to a decoded relatively higher frame rate, including the following steps: deriving, from the encoded video signal, at the relatively lower frame rate, a decoded high resolution component and a decoded low resolution component; increasing the frame rate of the decoded low resolution component by interpolating successive frames of the decoded low resolution component; increasing the frame rate of the decoded high resolution component by duplicating frames of the decoded high resolution component; and obtaining an output relatively higher frame rate video signal by combining the increased frame rate low resolution component and the increased frame rate high resolution component.

4 Claims, 2 Drawing Sheets

METHOD AND SYSTEM FOR CONVERSION OF DIGITAL VIDEO

PRIORITY CLAIM

Priority is claimed from U.S. Provisional Patent Application No. 61/192,049 filed Sep. 15, 2008, and said Provisional Patent Application is incorporated herein by reference.

FIELD OF THE INVENTION

This invention relates to the field of digital video, television, and theatre theatre presentation of video, and, more particularly, to a system and method for converting a digital video signal to a higher frame rate, with reduction of artifacts that typically result from such conversion.

BACKGROUND OF THE INVENTION

Consumer TV as well as motion picture theatres are slowly converting from 30 or 24 FPS to 60 FPS. This gives much better motion rendition and less motion blur. It also allows a higher brightness to be used without flicker. In a film theatre, the brightness is kept below 12 ft. Lamberts so that the 48 Hz shutter flicker is not visible. If the recorded images are kept at 30 FPS, then the recording capacity and bit rate is kept at a reasonable level.

The new HDTV DVDs like "blue ray" derive 60 FPS progressive scans from the recording. The systems also can display 30 FPS interlaced output. This may be done by recording an MPEG type compressed signal on the disc. For the 30 FPS output, I and P frames are used. For 60 FPS progressive, B frames are also included. This process involves a number of compromises. For example, since I frames are rather infrequent, sudden changes in motion can produce artifacts. The B frames used for the upgrade to 60 FPS have additional motion blur.

For the film industry, MPEG compression is not suitable. The infrequent I frames makes editing difficult. A compression system like JPEG2000 does not have problems editing since it is entirely intraframe coding. Typically, low compression ratios like 4:1 or 8:1 are used for maintaining good quality.

It is among the objects of the present invention to provide a system and method for addressing the foregoing and other limitations of prior art approaches, and for improving the conversion of digital video to higher frame rates.

SUMMARY OF THE INVENTION

An embodiment of the present invention can, for example, display JPEG2000 recordings made at 30 FPS with a display rate of 60 FPS. The technique takes advantage of the fact that the human visual system is slower for detecting detail than it is for detecting lower spatial frequencies. JPEG2000 uses subband coding. The image is split into octave wide bands and the higher detail bands have fewer bits of gray scale than lower bands. For the conversion of 60 FPS the lower bands simply interpolate between the adjacent frames to produce the 60 FPS output. These bands have lower resolution so that motion blur is not a serious problem for them. The higher band or bands are repeated to produce the 60 FPS detail. In one example, the camera that originates the signal can run, for example, at 30 FPS progressive and the electronic shutter can be open for 1/120 second.

In accordance with an embodiment of the technique of the invention, a method is set forth for converting an encoded digital video signal from a decoded relatively lower frame rate to a decoded relatively higher frame rate, including the following steps: deriving, from the encoded video signal, at said relatively lower frame rate, a decoded high resolution component and a decoded low resolution component; increasing the frame rate of said decoded low resolution component by interpolating successive frames of said decoded low resolution component; increasing the frame rate of said decoded high resolution component by duplicating frames of said decoded high resolution component; and obtaining an output relatively higher frame rate video signal by combining said increased frame rate low resolution component and said increased frame rate high resolution component.

In one form of this embodiment, the encoded digital video signal is in MPEG format, and the step of deriving, from the encoded video signal, at said relatively lower frame rate, a decoded high resolution component and a decoded low resolution component comprises providing an MPEG decoder that produces a decoded MPEG video signal, and providing high and low pass filtering to said decoded MPEG video signal to produce, respectively, said decoded high resolution component and said decoded low resolution component.

In another form of this embodiment, the encoded digital video signal is in JPEG format, and the step of deriving, from the encoded video signal, at said relatively lower frame rate, a decoded high resolution component and a decoded low resolution component comprises providing a JPEG decoder that produces said decoded high resolution component and said decoded low resolution component.

Examples of the relatively lower frame rate are 24 or 30 frames per second, and examples of the relatively higher frame rate are 48, 60, 96 or 120 frames per second.

In accordance with an embodiment of the apparatus of the invention, an apparatus is provided for converting an encoded digital video signal from a decoded relatively lower frame rate to a decoded relatively higher frame rate, including: a decoder for deriving, from the encoded video signal, at said relatively lower frame rate, a decoded high resolution component and a decoded low resolution component; an interpolator for increasing the frame rate of said decoded low resolution component by interpolating successive frames of said decoded low resolution component; a frame duplicator for increasing the frame rate of said decoded high resolution component by duplicating frames of said decoded high resolution component; and an adder for obtaining an output relatively higher frame rate video signal by combining said increased frame rate low resolution component and said increased frame rate high resolution component.

Further features and advantages of the invention will become more readily apparent from the following detailed description when taken in conjunction with the accompanying drawings.

DETAILED DESCRIPTION

Figure 1:
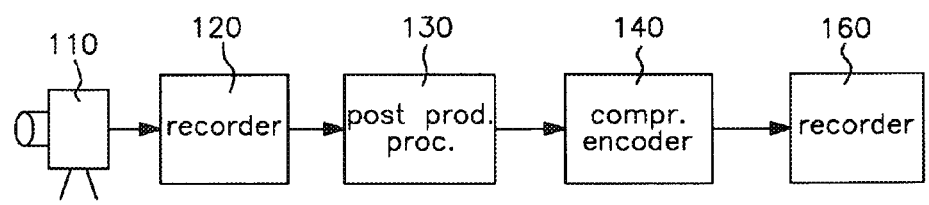
FIG. 1 shows a block diagram of a system for producing and recording encoded video signals.

Referring to FIG. 1, there is shown a block diagram of a system for producing and recording encoded video signals.

Examples are in terms of JPEG or MPEG encoding, but it will be understood that the principles of the invention are applicable to other encoding formats. A camera 110 can be a film camera with, for example, a 90 degree shutter or can be a digital camera with, for example, a 1/120 sec. electronic shutter. (The camera in this example, is shown with an exposure time that is half what is normally used. The technique hereof also works with the normal exposure. With the normal exposure there would be a little more motion blur than with the shorter exposure. The longer exposure is normally used so that the higher motion blur obscures the jerky motion of the low frame rate in the display.) The camera output is recorded (block 120), and the video signal output of the recorder is subjected to conventional post production processing (block 130) and then compression encoded (block 140) using, for example a JPEG or an MPEG encoder, and recorded (block 160).

Figure 2:
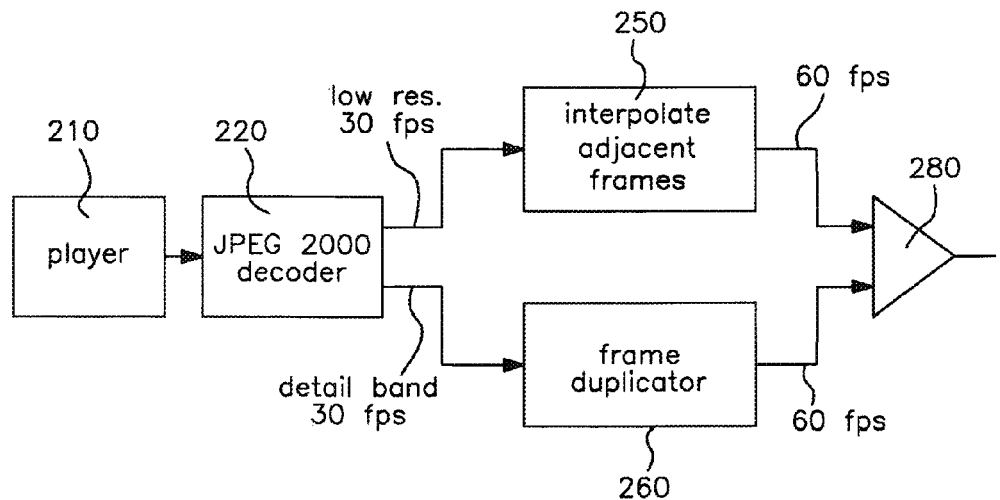
FIG. 2 shows a block diagram illustrating processing, for example, for theatre projection using JPEG2000.

FIG. 2 Is a block diagram illustrating processing, for example, for theatre projection using JPEG2000. In FIG. 2, the recorded signal from a player 210 is coupled to JPEG2000 decoder 220, the output of which includes a relatively low resolution component at 30 frames per second (fps), and a relatively high resolution (detail bands) component at 30 fps. A digital interpolator 250 receives the low resolution component at 30 fps, and interpolates an output at twice the input frame rate; that is, 60 fps for this example. The detail component is input to a frame duplicator 260, which includes a frame store, and is operative, in this example, to double the frame rate of the detail bands; that is, to 60 fps. The 60 fps low resolution and detail signals are added, by adder 280, and the resultant composite signal is, in this example, displayed by a digital theatre projector.

Figure 3:
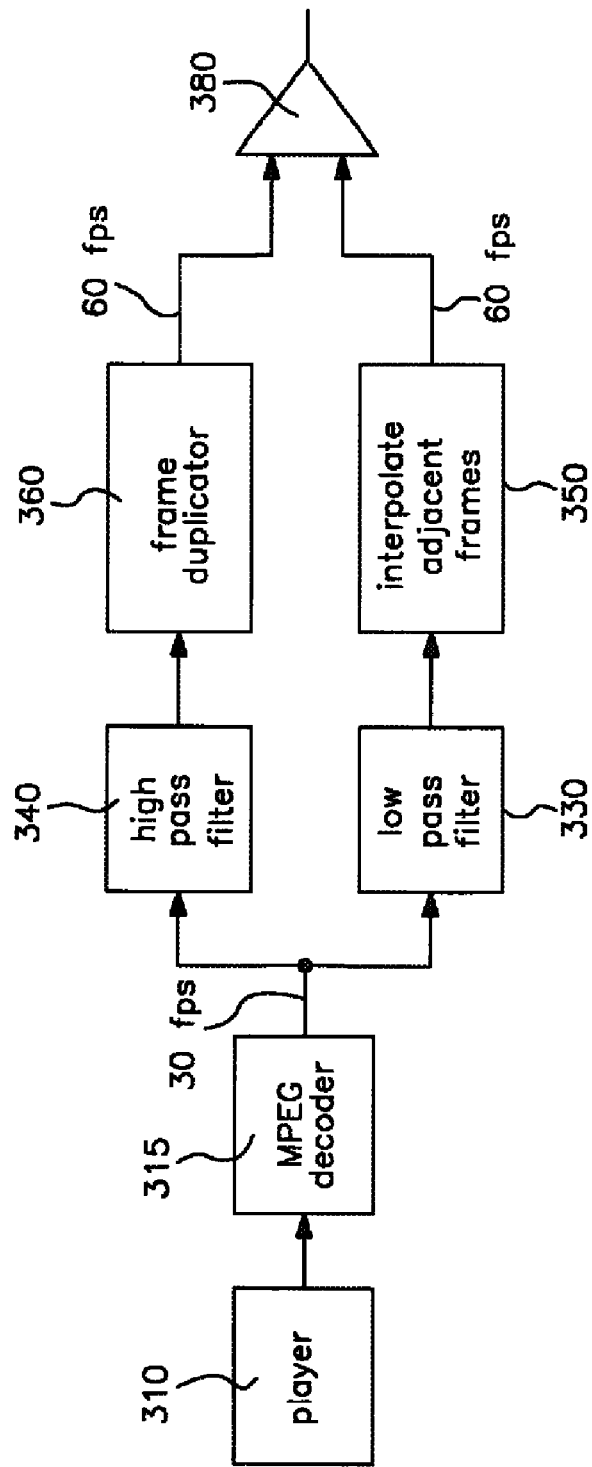
FIG. 3 shows a block diagram illustrating processing, for example, for a television display or for theatre projection, using an MPEG encoded signal.

FIG. 3 is a block diagram illustrating processing, for example, for a television display or for theatre projection, using an MPEG encoded signal. In FIG. 3, the recorded signal from a player 310 is coupled to an MPEG decoder which, in this example, produces a 30 fps output which is low pass filtered by a filter 330 and high pass filtered by a filter 340. The outputs of the filters, which are, respectively, relatively low and high resolution component signals at 30 fps, are then processed in a manner similar to the FIG. 2 processing. Specifically, a digital interpolator 350 receives the low resolution component at 30 fps, and interpolates an output at twice the input frame rate; that is, 60 fps for this example. The detail component is input to a frame duplicator 360, which includes a frame store, and is operative, in this example, to double the frame rate of the detail bands; that is, to 60 fps. The 60 fps low resolution and detail signals are added, by adder 380, and the resultant composite signal is, in this example, displayed by a digital television display or a digital theatre projector.

In the examples set forth, the camera is running at 30 fps. It may alternatively run at another rate, for example 24 fps. For MPEG the decoder may, for example, put out 30 fps using a 3-2 routine (i.e., for the interpolation and duplication). The final output may be, for example, at 48, 60, 96 or 120 fps. The same routines apply, but the number of duplications and interpolations will differ depending on the input frame rate and the output frame rate.

For television sets, they are now available with 60 P and 120 P displays. Conventionally, they do not do any processing other than duplicating frames. Much better motion rendition can be achieved using the technique and apparatus hereof.

The invention claimed is:

1. A method for converting an encoded digital video signal in MPEG format from a decoded relatively lower frame rate to a decoded relatively higher frame rate, comprising the steps of:
    deriving, from the encoded video signal, at said relatively lower frame rate, a decoded high resolution component and a decoded low resolution component comprising providing an MPEG decoder that produces a decoded MPEG video signal, and providing high and low pass filtering to said decoded MPEG video signal to produce, respectively, said decoded high resolution component and said decoded low resolution component;
    increasing the frame rate of said decoded low resolution component by interpolating successive frames of said decoded low resolution component;
    increasing the frame rate of said decoded high resolution component by duplicating frames of said decoded high resolution component; and
    obtaining an output relatively higher frame rate video signal by combining said increased frame rate low resolution component and said increased frame rate high resolution component.

2. The method as defined by claim 1, further comprising displaying said output relatively higher frame rate video signal using a theatre projector.

3. The method as defined by claim 1, further comprising displaying said output relatively higher frame rate video signal using a television display.

4. Apparatus for converting an encoded digital video signal in MPEG format from a decoded relatively lower frame rate to a decoded relatively higher frame rate, comprising:
    a decoder for deriving, from the encoded video signal, at said relatively lower frame rate, a decoded high resolution component and a decoded low resolution component, said decoder comprising an MPEG decoder that produces a decoded MPEG video signal, and a high pass filter and a low pass filter for receiving said decoded MPEG video signal to produce, respectively, said decoded high resolution component and said decoded low resolution component;
    an interpolator for increasing the frame rate of said decoded low resolution component by interpolating successive frames of said decoded low resolution component;
    a frame duplicator for increasing the frame rate of said decoded high resolution component by duplicating frames of said decoded high resolution component; and
    an adder for obtaining an output relatively higher frame rate video signal by combining said increased frame rate low resolution component and said increased frame rate high resolution component.

* * * * *